United States Patent
Gruebl et al.

(10) Patent No.: US 10,155,629 B2
(45) Date of Patent: Dec. 18, 2018

(54) APPARATUS FOR CONVEYING A PRODUCT STREAM OF CHUNK POLYSILICON OR GRANULAR POLYSILICON

(71) Applicant: Wacker Chemie AG, Munich (DE)

(72) Inventors: Peter Gruebl, Eichendorf (DE); Martin Brixel, Kirchdorf (DE); Thomas Fichtner, Burghausen (DE); Max Hitzenberger, Reut (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/576,550

(22) PCT Filed: May 20, 2016

(86) PCT No.: PCT/EP2016/061470
§ 371 (c)(1),
(2) Date: Nov. 22, 2017

(87) PCT Pub. No.: WO2016/188917
PCT Pub. Date: Dec. 1, 2016

(65) Prior Publication Data
US 2018/0148267 A1    May 31, 2018

(30) Foreign Application Priority Data

May 26, 2015 (DE) .................. 10 2015 209 589

(51) Int. Cl.
*B65G 43/08* (2006.01)
*B07C 5/344* (2006.01)
*B65G 27/04* (2006.01)

(52) U.S. Cl.
CPC .............. *B65G 43/08* (2013.01); *B07C 5/344* (2013.01); *B65G 27/04* (2013.01); *B07C 2501/0036* (2013.01); *B65G 2201/042* (2013.01); *B65G 2203/0208* (2013.01); *B65G 2203/042* (2013.01)

(58) Field of Classification Search
CPC ......... B65G 43/08; B07C 5/34; B07C 5/3416; G01N 23/223
USPC ........................ 324/240, 360, 329; 198/690.1
See application file for complete search history.

(56) References Cited

U.S. PATENT DOCUMENTS

| | | | | |
|---|---|---|---|---|
| 5,654,637 A | * | 8/1997 | McNeill ................. | G01V 3/107 324/329 |
| 2003/0206008 A1 | * | 11/2003 | Le ........................... | G01B 7/105 324/230 |
| 2005/0034430 A1 | | 2/2005 | Hoelzlwimmer et al. | |
| 2007/0235574 A1 | | 10/2007 | Schaefer et al. | |
| 2009/0295391 A1 | * | 12/2009 | Bosnar .................... | G01V 11/00 324/329 |
| 2010/0164512 A1 | | 7/2010 | Kiss et al. | |

(Continued)

FOREIGN PATENT DOCUMENTS

| | | |
|---|---|---|
| CN | 202052624 U | 11/2011 |
| GB | 654150 A | 6/1951 |

(Continued)

*Primary Examiner* — James R Bidwell
(74) *Attorney, Agent, or Firm* — Brooks Kushman P.C.

(57) ABSTRACT

Foreign objects in a conveyed product stream of granular or chunk polysilicon is effected by identifying the foreign objects by eddy current sensors in the conveyor by which the granular or chunk polysilicon is being conveyed.

18 Claims, 1 Drawing Sheet

(56) References Cited

U.S. PATENT DOCUMENTS

| | | | | |
|---|---|---|---|---|
| 2013/0079918 A1* | 3/2013 | Spencer | ................ | B07C 5/3416 |
| | | | | 700/223 |
| 2013/0260645 A1 | 10/2013 | Takahashi et al. | | |
| 2015/0108047 A1* | 4/2015 | Rem | ................ | B03C 1/247 |
| | | | | 209/555 |
| 2017/0371061 A1* | 12/2017 | Zhao | ................ | G01V 3/105 |

FOREIGN PATENT DOCUMENTS

| | | |
|---|---|---|
| JP | 2001074851 A2 | 3/2001 |
| JP | 2010519522 T2 | 6/2010 |
| TW | 201347911 A | 12/2013 |
| WO | 2011082728 A1 | 7/2011 |
| WO | 2016188917 A1 | 12/2016 |

\* cited by examiner

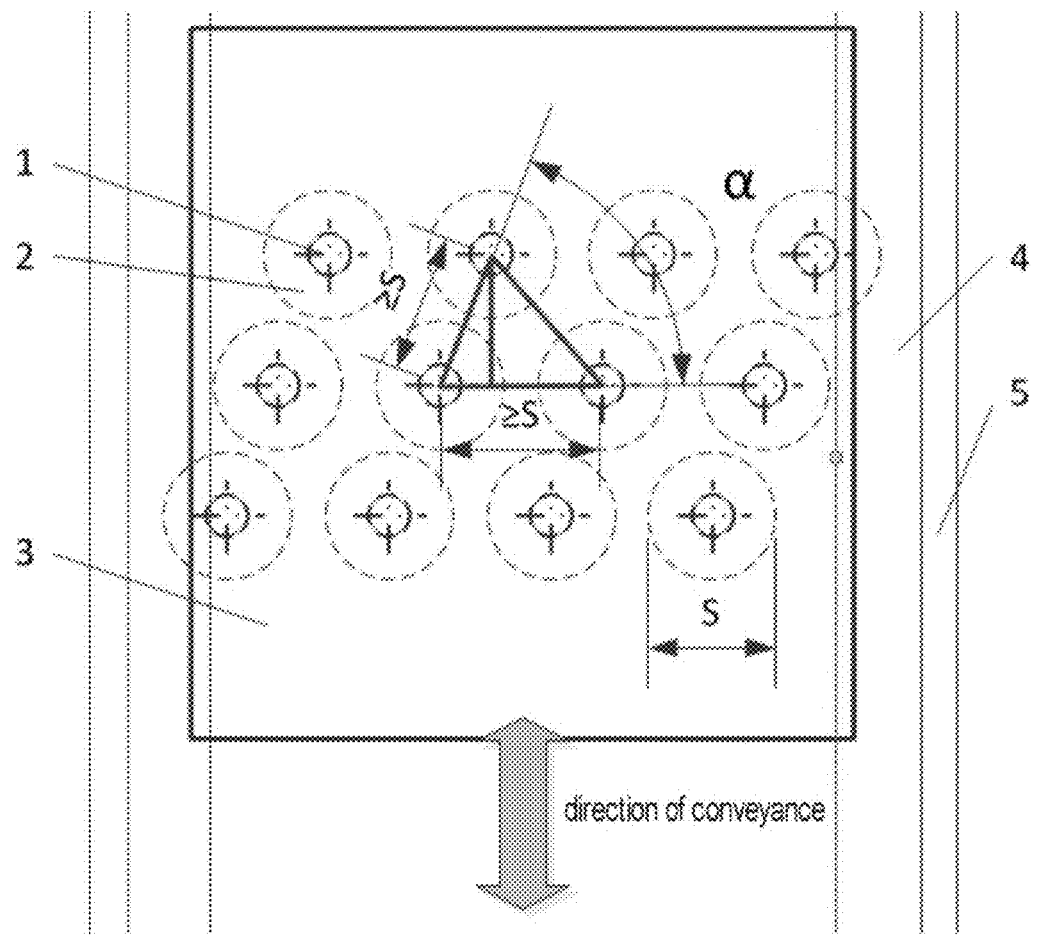

APPARATUS FOR CONVEYING A PRODUCT STREAM OF CHUNK POLYSILICON OR GRANULAR POLYSILICON

CROSS REFERENCE TO RELATED APPLICATIONS

This application is the U.S. National Phase of PCT Appln. No. PCT/EP2016/061470 filed May 20, 2016, which claims priority to German Application No. 10 2015 209 589.4 filed May 26, 2015, the disclosures of which are incorporated in their entirety by reference herein.

BACKGROUND OF THE INVENTION

1. Field of the Invention

The invention relates to an apparatus for conveying a product stream of chunk polysilicon or granular polysilicon. In particular, the invention relates to an apparatus for identifying metallic foreign objects in such a product stream.

2. Description of the Related Art

Polycrystalline silicon (polysilicon for short) serves as a starting material for production of monocrystalline silicon for semiconductors by the Czochralski (CZ) or zone melting (FZ) processes, and for production of mono- or multicrystalline silicon by various pulling and casting processes for production of solar cells for the photovoltaics sector.

Granular polycrystalline silicon or "granular polysilicon" for short, is produced in a fluidized bed reactor. This is accomplished by fluidizing silicon particles in a fluidized bed by means of a gas flow, the bed being heated to high temperatures via a heating apparatus.

Addition of a silicon-containing reaction gas brings about a pyrolysis reaction at the hot particle surface. This deposits elemental silicon on the silicon particles and the individual particles increase in diameter. Regular withdrawal of particles that have grown in diameter and addition of relatively small silicon particles as seed particles allows the process to be operated in continuous fashion with all the attendant advantages thereof. Silicon-containing reactant gases that may be used are silicon-halogen compounds (for example chlorosilanes or bromosilanes), monosilane ($SiH_4$) and mixtures of these gases with hydrogen.

Once produced, the granular polysilicon is typically divided into two or more fractions or classes by means of a screening plant (classification). The smallest screen fraction (screen undersize) may subsequently be processed into seed particles in a milling plant and added to the reactor.

The screen target fraction is typically packed and transported to the customer. The customer uses the granular polysilicon inter alia for growing single crystals according to the Czochralski process (CZ process).

Polycrystalline silicon may likewise be produced by means of the Siemens process. This method comprises heating support bodies, typically thin filament rods of silicon, by direct passage of current in a bell-jar-shaped reactor ("Siemens reactor") and introducing a reaction gas comprising hydrogen and one or more silicon-containing components.

The silicon-containing component used is typically trichlorosilane ($SiHCl_3$, TCS) or a mixture of trichlorosilane with dichlorosilane ($SiH_2Cl_2$, DCS) and/or with tetrachlorosilane ($SiCl_4$, STC). Silane ($SiH_4$) is used less commonly but also on an industrial scale.

The filament rods are inserted vertically into electrodes at the reactor base, through which they are connected to the power supply. High-purity polysilicon is deposited on the heated filament rods and the horizontal bridge to increase the diameter thereof over time. Once the rods have cooled, the reactor bell jar is opened and the rods are removed by hand or with the aid of specific devices, so-called deinstallation aids, for further processing or for intermediate storage.

For most applications polycrystalline silicon rods are broken into small chunks which are usually then classified by size.

US 2007/0235574 A1 discloses an apparatus for comminuting and sorting polycrystalline silicon, comprising a feeding device for feeding a coarse chunk polysilicon into a crushing plant, and then into a sorting plant for classifying the chunk polysilicon, wherein the apparatus is provided with a controller which allows variable adjustment of at least one crushing parameter in the crushing plant and/or at least one sorting parameter in the sorting plant.

The crushing plant may be a multistage crushing plant composed of 1 to 10 crushers.

The sorting plant may be composed of a multistage mechanical screening plant and a multistage optoelectronic separating plant. The mechanical screening plant serves to remove fines fractions in the product stream. The chunk polysilicon freed of fines fractions is sorted by means of an optoelectronic separating plant. The sorting of the chunk polysilicon is effected according to one to three of the criteria selected from the group of length, area, shape, morphology, color and weight of the chunk polysilicon.

However, other combinations of known electronic sensor technologies for identifying parameters of the polysilicon chunks are likewise suitable (for example metal detector, ultrasound, infrared).

It is possible to arrange magnetic separators (for example plate magnets, drum magnets or belt magnets) between the individual crushing stages and also within and downstream of the sorting plants to remove metallic foreign objects from the chunk polysilicon and reduce the metal contamination of the chunk polysilicon. The disadvantage is that only ferromagnetic foreign objects such as iron may be removed. Nonmagnetic metallic foreign objects cannot be removed.

US 2005/034430 A1 discloses an apparatus comprising a conveying channel for the chunk polysilicon, a weighing apparatus for the chunk polysilicon having a funnel and deflection plates, a filling apparatus which forms plastic bags from a high-purity plastic film, a weld-sealing apparatus for the plastic bags filled with chunk polysilicon, a flow box which is mounted above the conveying channel, weighing apparatus, filling apparatus and weld-sealing apparatus and which prevents particle contamination of the chunk polysilicon, and a conveyor belt for the weld-sealed plastic bags filled with chunk polysilicon, wherein all component parts coming into contact with the chunk polysilicon are sheathed with silicon or lined with a highly wear-resistant plastic.

The chunk polysilicon is transported to a weighing apparatus on a silicon-sheathed conveying channel, wherein the chunk polysilicon empties from the funnel into a plastic bag, the plastic bag is weld-sealed after filling and the plastic bag filled with chunk polysilicon is passed via a conveyor belt through a magnetoinductive detector to detect any metal contamination.

The disadvantage is that the metallic foreign objects can be detected only after packaging.

CN 202052624 U describes a sorting apparatus for separating metals or highly-doped silicon from normal silicon.

The material is situated in a product reservoir. The product reservoir is connected to a detection device comprising eddy current sensors and a removal mechanism. A conveyor belt may optionally be present in the detection device in order to convey the silicon. The eddy current detection apparatus optionally relays a signal to the separating mechanism to effect automatic removal of metals or highly-doped silicon.

The described arrangement would not be suitable for metallic conveying channels due to interference with the eddy current sensors. Detection of metals in a product stream comprising polysilicon would therefore not be possible.

The object to be achieved by the invention arose from the problems described.

SUMMARY OF THE INVENTION

The invention is thus directed to an apparatus for conveying a product stream of chunk polysilicon or granular polysilicon, comprising a conveying surface made of metal, which is lined with plastic or with silicon, and eddy current sensors for detection of metallic or electrically conductive foreign objects in the product stream. Such an apparatus, also referred to hereinbelow as a conveying device, makes it possible to identify metallic foreign objects of any type, even nonmagnetic ones. In addition, a product stream comprising polysilicon may be analyzed for metallic foreign objects even prior to packaging.

The invention is also directed to a method of identifying metallic or electrically conductive foreign objects in a product stream of chunk polysilicon or granular polysilicon, wherein the product stream is moved on a plastic- or silicon-lined metallic conveying surface of an apparatus according to the invention, wherein the detection of the foreign objects is effected by means of eddy current sensors.

BRIEF DESCRIPTION OF THE DRAWINGS

FIG. 1 is a schematic diagram of a conveying channel having an integrated sensor unit comprising sensors arranged transversely to the direction of conveyance in two rows.

DETAILED DESCRIPTION OF THE PREFERRED EMBODIMENTS

In principle any plant (even metallic plants) used in the production of polysilicon may be retrofitted with such an apparatus in relatively simple fashion. Existing plants or lining materials need not be adapted. Use of the apparatus according to the invention does not impair polysilicon purity.

In one embodiment the conveying device is a conventional transport channel or plant, preferably a vibratory conveying channel, comprising a conveying trough or channel trough which forms the conveying surface and is lined with plastic or silicon. The lining serves to protect the polysilicon product stream moved on the conveying or channel trough from contamination, especially since the conveying surface is made of metal.

In one embodiment the eddy current sensors for detection of the foreign objects are installed directly in the conveying or channel trough, namely below the plastic or silicon lining thereof.

In one embodiment the eddy current sensors have a modular construction comprising a housing top section, a housing middle section and a housing bottom section. The sensors may be secured in the housing middle section. The cabling for the sensors is passed into the housing via the housing bottom section. The housing top section serves to cover the sensors. The lining of the conveying or channel trough may also be secured to the housing top section. The modular construction of the housing makes it easier to change the sensors, housing sections etc. The housing bottom section may comprise a welded-in stainless steel plate for equalizing the sensors and a plurality of cable entry ports. The cable entry ports serve to pass the sensor cable into the housing. The middle housing section serves to secure the sensors and to embed the sensor cables. The housing top section is arranged immediately above the sensors and serves to cover the sensors and to secure the lining. The 3-piece housing is preferably assembled in a dust-tight fashion by means of screw connections.

In a preferred embodiment the eddy current sensors are secured in a single-piece electrically nonconductive housing. The detection surface of the sensor is preferably protected by a highly-resistant nonconductive material on wear and contamination grounds. The lining of the conveying or channel trough may additionally be secured to the housing. Changing of the sensor means may be carried out individually without disassembly of the housing from the underside of the conveying unit.

In another embodiment the housing is a dust-impermeable plastic housing.

In one embodiment, lateral linings of the conveying or channel trough are also present. The linings are made of nonconductive materials, for example plastic, silicon or ceramic. The use of polyurethane ("PU") is preferred.

In one embodiment a plurality of eddy current sensors are arranged in a row and transversely to the direction of the product stream. In another, preferred, embodiment a plurality of eddy current sensors are arranged in a plurality of rows offset relative to one another transversely and in the direction of the product stream.

In order to avoid interference a certain minimum distance S between nearest adjacent sensors should be present.

In one embodiment two or more parallel rows of eddy current sensors are arranged transversely to the direction of conveyance.

On account of the mutual field influencing, the minimum distance S must be maintained between the individual sensors as a function of the sensor intensity. The nearest adjacent sensors of the second row must likewise maintain the minimum distance S, there being at least a distance S to the sensors of the first row.

The detection accuracy of the apparatus may be varied by means of the offset angle $\alpha$ of the sensor rows, while observing the minimum distance S between one another, and the number thereof.

The detection accuracy may moreover be increased via an only small distance between the central axis of the sensor and the central axis of the foreign object. The highest accuracy is achieved via a distance=0.

In one embodiment the conveying device is switched off via evaluation electronics when a foreign object is detected.

In one embodiment the housing with the sensors situated therein is mounted to the conveying or channel trough of the conveying device. The housing is situated below the lining of the conveying or channel trough. Securing is effected by clamping to the lateral lining parts.

In one embodiment the housing is made of plastic, preferably of polyamide.

A certain distance between the sensors and the housing top section should be maintained. This ensures that the sensors are not damaged by vibrations.

The number of sensors depends on the channel width, the sensor field line intensity, the detection accuracy and reliability.

The width of the conveying surface/the channel width may be from 200 mm up to 2000 mm. In one embodiment the channel width is 400-600 mm.

The greater the conveying surface the greater the number of sensors required.

The distance S between the sensors should be chosen such that no mutual impairment of adjacent eddy current sensors occurs.

The distance S between the sensors is preferably from 30 to 200 mm and in one embodiment the distance S is 80-120 mm.

The width of the lateral lining should be chosen such that the channel trough does not interfere with the field lines.

A high detection reliability for relatively small metallic or electrically conducting foreign objects can be achieved via a sensor arrangement comprising a plurality of sensor rows, wherein the sensor rows are arranged offset relative to one another transversely to the direction of conveyance. This better covers the entire conveying surface.

On account of the interspace (distance S) between two sensors of one row a small foreign object conveyed with the product stream could remain undiscovered. However, when a second row of sensors parallel to the first row is present it is ensured that even this small foreign object will be detected. It is also possible for more than two sensor rows to be present to achieve an even better detection accuracy. The preferred number of sensor rows depends on the sensor distance S in the first row.

When a second row having sensors parallel to the first row is present it is preferable that at least the minimum distance S between the sensors be maintained.

To enhance detection accuracy more than two sensor rows offset with respect to the preceding row may also be present. The number of sensor rows is preferably up to 5. The offset of the rows relative to one another is to be implemented as a function of the required detection accuracy.

On account of different field line configurations within the detection radius of a sensor and thus over a detection row, the arrangement of a plurality of rows must be chosen such that the required detection accuracy represents the necessary detection reliability over the required width via the offsetting of subsequent rows.

Thus in one embodiment the sensor arrangement is chosen such that a triangle having the minimum side lengths S is formed when the central points of two nearest adjacent sensors of one row are connected to the central point of the common nearest adjacent sensor of another row cf. FIG. 1.

The evaluation of the eddy current sensors may be effected via a current output signal, preferably via a voltage output signal.

A change in the voltage signal brought about by a metallic or electrically conductive foreign object allows the conveying channel to be stopped via evaluation electronics.

The features cited in connection with the abovedescribed embodiments of the method according to the invention may be correspondingly applied to the apparatus according to the invention. Conversely, the features cited in connection with the abovedescribed embodiments of the apparatus according to the invention may be correspondingly applied to the method according to the invention. These and other features of the embodiments according to the invention are elucidated in the description of the figures and in the claims. The individual features can either be realized separately or in combination as embodiments of the invention. Said features may further describe advantageous implementations eligible for protection in their own right.

LIST OF REFERENCE NUMERALS EMPLOYED 1 sensor
2 sensor intensity
3 housing
4 lining
5 channel trough
$\alpha$ offset angle FIG. 1 shows a housing 3 which is mounted to the channel trough 5 of the transport unit and comprises sensors 1 having an intensity 2.

The distance S between the sensors 1 is chosen depending of their intensities 2 such that no mutual influencing of the sensors 1 occurs.

The housing 3 is clamped to the lining of the channel trough (not shown) via the lateral lining 4.

Also shown is the direction of conveyance in which the product stream moves.

Three rows of sensors 1 are present which are arranged in parallel and transversely to the direction of conveyance.

The nearest adjacent sensors 1 are each spaced apart from one another by the distance S.

In addition, one row is offset relative to another row transversely to the direction of conveyance by the distance S/2.

The description hereinabove of illustrative embodiments is to be understood as being exemplary. The disclosure made thereby enables a person skilled in the art to understand the present invention and the advantages associated therewith and also encompasses alterations and modifications to the described structures and methods obvious to a person skilled in the art. All such alterations and modifications and also equivalents shall therefore be covered by the scope of protection of the claims.

The invention claimed is:

1. An apparatus for conveying a product stream of chunk polysilicon or granular polysilicon, the apparatus comprising a metal conveying surface and a lining of non-contaminating plastic or silicon above the metal conveying surface, and a plurality of eddy current sensors mounted in the apparatus below the product stream for detection of metallic or electrically conductive foreign objects in the product stream.

2. The apparatus of claim 1, wherein the eddy current sensors are situated in a housing below the non-contaminating lining.

3. The apparatus of claim 2, further comprising lateral linings to which the housing and non-contaminating lining are clamped.

4. The apparatus of claim 1, wherein the eddy current sensors are arranged in a plurality of parallel and spaced-apart rows transversely to the product stream direction of conveyance.

5. The apparatus of claim 2, wherein the eddy current sensors are arranged in a plurality of parallel and spaced-apart rows transversely to the product stream direction of conveyance.

6. The apparatus of claim 3, wherein the eddy current sensors are arranged in a plurality of parallel and spaced-apart rows transversely to the product stream direction of conveyance.

7. The apparatus of claim 4, wherein at least one row of eddy current sensors is arranged transversely offset relative to another row of eddy current sensors.

8. The apparatus of claim 4, wherein the eddy current sensors are arranged such that a triangle having minimum side lengths S is formed when the central points of two nearest adjacent eddy current sensors of one row are connected to the central point of the common nearest adjacent eddy current sensor of an adjacent row.

9. The apparatus of claim 7, wherein the eddy current sensors are arranged such that a triangle having minimum side lengths S is formed when the central points of two nearest adjacent eddy current sensors of one row are connected to the central point of the common nearest adjacent eddy current sensor of an adjacent row.

10. A method of identifying metallic or electrically conductive foreign objects in a product stream of chunk polysilicon or granular polysilicon, wherein the product stream is moved on a plastic- or silicon-lined metallic conveying surface of an apparatus of claim 1, wherein the detection of the foreign objects is effected by means of eddy current sensors.

11. A method of identifying metallic or electrically conductive foreign objects in a product stream of chunk polysilicon or granular polysilicon, wherein the product stream is moved on a plastic- or silicon-lined metallic conveying surface of an apparatus of claim 2, wherein the detection of the foreign objects is effected by means of eddy current sensors.

12. A method of identifying metallic or electrically conductive foreign objects in a product stream of chunk polysilicon or granular polysilicon, wherein the product stream is moved on a plastic- or silicon-lined metallic conveying surface of an apparatus of claim 3, wherein the detection of the foreign objects is effected by means of eddy current sensors.

13. A method of identifying metallic or electrically conductive foreign objects in a product stream of chunk polysilicon or granular polysilicon, wherein the product stream is moved on a plastic- or silicon-lined metallic conveying surface of an apparatus of claim 4, wherein the detection of the foreign objects is effected by means of eddy current sensors.

14. A method of identifying metallic or electrically conductive foreign objects in a product stream of chunk polysilicon or granular polysilicon, wherein the product stream is moved on a plastic- or silicon-lined metallic conveying surface of an apparatus of claim 7, wherein the detection of the foreign objects is effected by means of eddy current sensors.

15. A method of identifying metallic or electrically conductive foreign objects in a product stream of chunk polysilicon or granular polysilicon, wherein the product stream is moved on a plastic- or silicon-lined metallic conveying surface of an apparatus of claim 8, wherein the detection of the foreign objects is effected by means of eddy current sensors.

16. The method of claim 10, wherein conveying of the chunk polysilicon or granular polysilicon is interrupted via evaluation electronics when a foreign object is detected.

17. The apparatus of claim 1, which comprises a vibratory conveying trough.

18. The apparatus of claim 1, wherein the non-contaminating lining is a silicon lining.

* * * * *